L. W. HARDY.
COMBINATION SUPPORT AND CANOPY.
APPLICATION FILED JAN. 29, 1917.
1,363,728.
Patented Dec. 28, 1920.
3 SHEETS—SHEET 1.
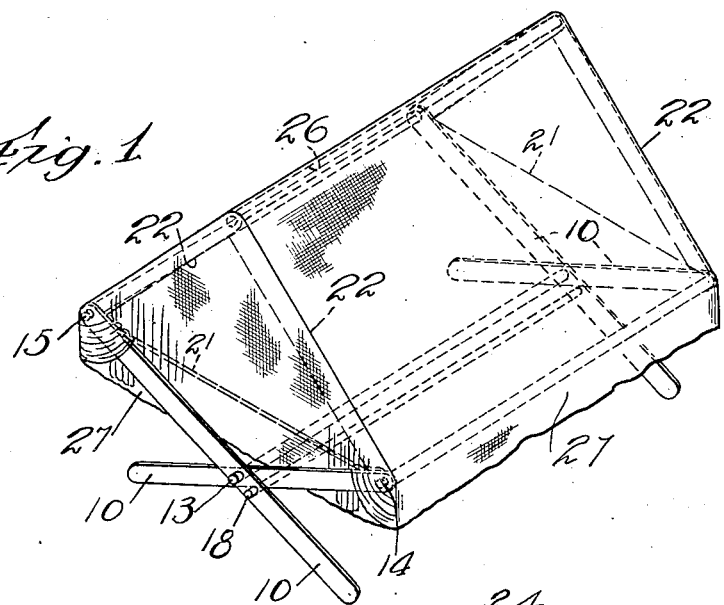
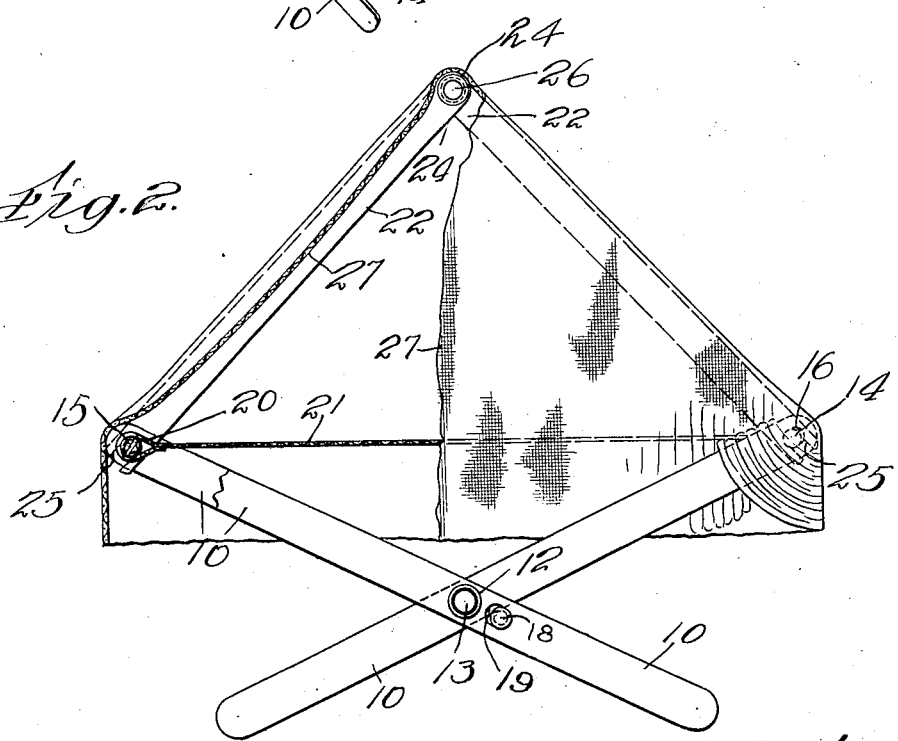

L. W. HARDY.
COMBINATION SUPPORT AND CANOPY.
APPLICATION FILED JAN. 29, 1917.
1,363,728.
Patented Dec. 28, 1920.
3 SHEETS—SHEET 2.
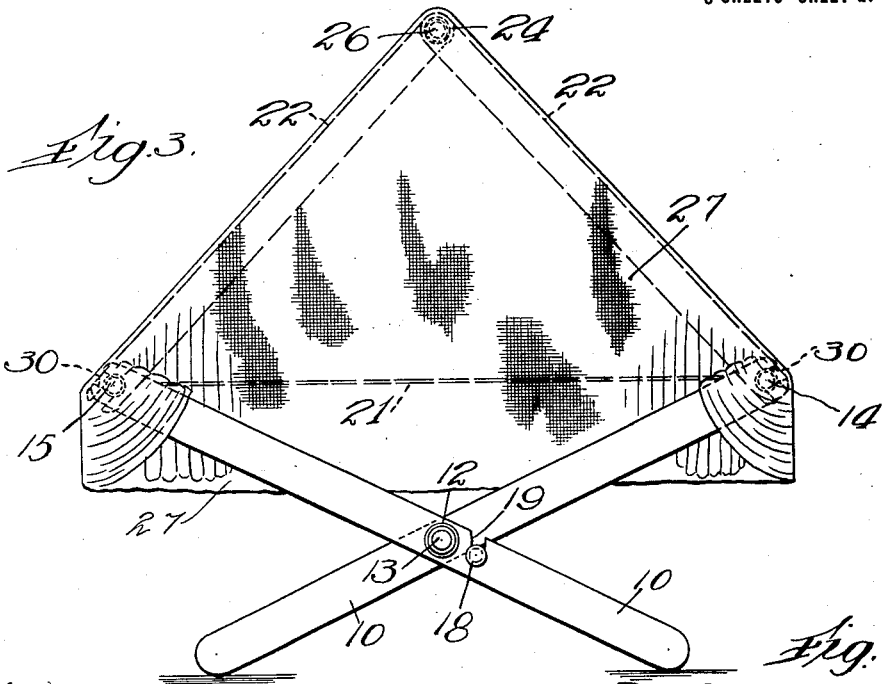
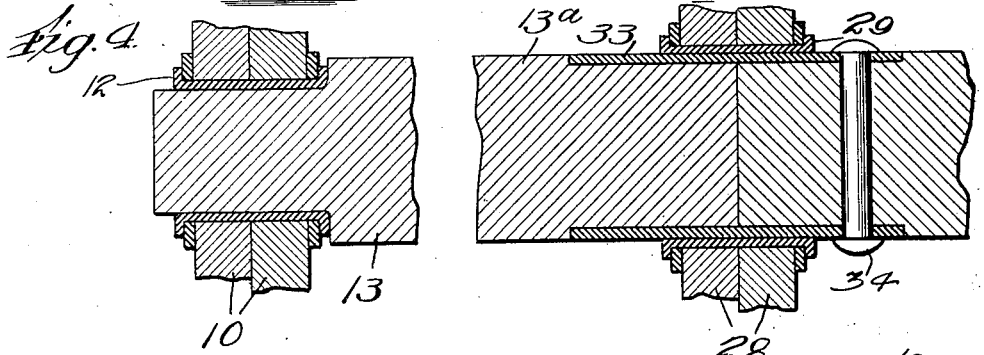
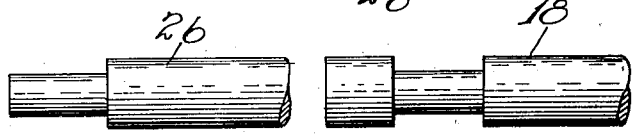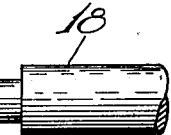
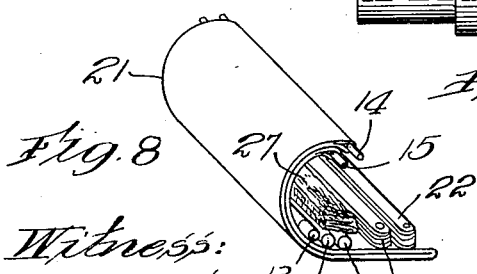
Witness:
Paul A. Niesen
Inventor:
Lewis W. Hardy
by Carl Prover
his Atty.

L. W. HARDY.
COMBINATION SUPPORT AND CANOPY.
APPLICATION FILED JAN. 29, 1917.

1,363,728. Patented Dec. 28, 1920.
3 SHEETS—SHEET 3.

Witness:
Paul A. Viersen

Inventor
Lewis W. Hardy.
by Carl Strover
his Atty.

UNITED STATES PATENT OFFICE.

LEWIS W. HARDY, OF CHICAGO, ILLINOIS.

COMBINATION SUPPORT AND CANOPY.

1,363,728.  Specification of Letters Patent.  Patented Dec. 28, 1920.

Application filed January 29, 1917. Serial No. 145,267.

*To all whom it may concern:*

Be it known that I, LEWIS W. HARDY, a citizen of the United States, residing in the city of Chicago, county of Cook, and State of Illinois, have invented a certain new and useful Combination Support and Canopy, of which the following is a specification.

The object of my invention is to provide a combination support and canopy of simple construction which can be easily and quickly set up and taken down, is of light weight, may be readily folded up into a package of small size, and the fabric parts of which may be readily washed.

Figure 9:
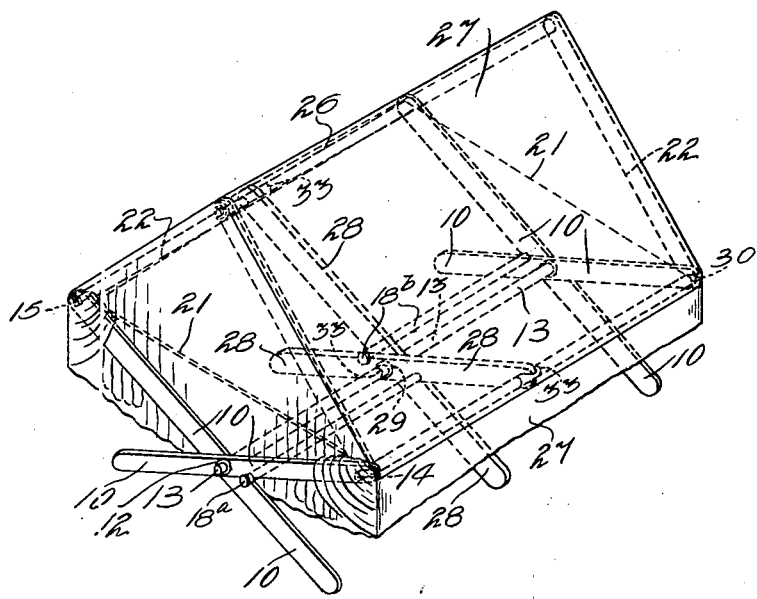
Figure 10:
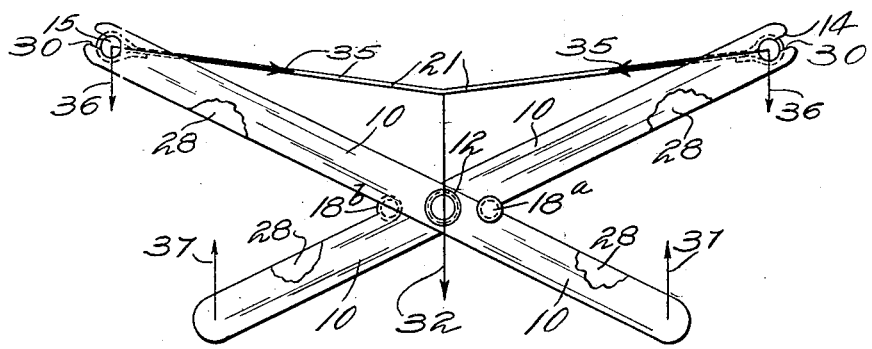

In the drawings, Figure 1 is a perspective view of my support and canopy, as used for a baby-cot; Fig. 2 is an end-elevation of the same support and canopy; Fig. 3 is a like view of a modified form of such support and canopy; Fig. 4 is a detail section of a part of the frame of my support; Fig. 5 is a sectional detail view, showing the connection between the auxiliary sustaining members, used in my support when constructed as a cot for adults, and the divided connecting rod employed in this construction; Figs. 6 and 7 are detail views showing the two different shapes in which I prefer to form the ends of the longitudinal rods of my support and canopy; Fig. 8 is a perspective view of the various portions of my device (in the form of a baby-cot) assembled ready for folding; Fig. 9 is a perspective view of my device as preferably constructed when used as a cot for adults; and Fig. 10 is a schematic view illustrating the structural advantage realized in my device by locating the joint in each pair of the sustaining members of my device nearer to the lower end than to the upper end thereof.

Referring to the drawings, two pairs of flat sustaining members 10, preferably made of tough wood, are each oscillatably joined together by a hollow metallic member 12, and connected by a stay-rod 13, the ends of which are entered into members 12. Carrying rods 14 and 15 are entered into openings 16, near the upper ends of members 10. An additional stay-rod 18 is entered into openings 19, which are provided in members 10. These openings may consist either of holes bored through members 10, as shown in Figs. 1 and 2, or of notches cut into the edges of members 10, as shown in Fig. 3. This additional rod 18 not only serves to prevent members 10 from collapsing to the ground while the cot is being set up, but aids materially in bracing it, and providing general stability. Rods 14 and 15, before being entered into openings 16, are passed through loops 20, formed along opposite edges of a canvas 21 which is suspended between rods 14 and 15. Two pairs of flat braces 22 are each oscillatably united near their upper ends by hollow metallic members 24, and are, at their lower ends, provided with slots 25. Rod 26 having first been entered into members 24, braces 22 are placed so as to engage, with slots 25, rods 14 and 15 between members 10 and the adjoining edges of canvas 21. A cover 27, consisting preferably of a rectangular piece of fabric, is placed over braces 22 and rod 26 so as to have its sides hang along rods 14 and 15, while its ends are preferably tucked in between members 10 and the ends of canvas 21.

While rods 13, 14, 15, 18 and 26 may be made of various substances, or tubing may be substituted for these rods, I prefer to use dowel lumber, especially for the smaller and lighter forms of my support and canopy, on account of its inexpensiveness. All of these rods are preferably provided with reduced portions at or near their ends, forming shoulders, or grooves, as shown in Figs. 6 and 7, respectively, in order that a positive fit for them may be secured in the openings into which they are respectively inserted, also in order that a definite spacing of all parts may be attained.

In the case of rods 13 and 26 the reduction is made at the ends, as shown in Fig. 6, while in the case of rods 14, 15 and 18 the reduction is preferably made near the ends, as shown in Fig. 7.

Where my device is constructed as a cot and canopy for adults, I provide additional sustaining members 28, oscillatably connected by hollow metallic members 29; these members 28 and 29 being in all respects like members 10 and 12, except that members 28 are made somewhat heavier than members 10, and the openings in members 29 are made of larger diameter than the openings in members 12, in order to allow free passage for rod 13.

In this construction rods 13, 14, 15, 18 and 26 are preferably made in two portions, as shown in Fig. 9; the two portions being in each instance (except in the case of rod 18)

united by collars 33 which I prefer to mount on one of the portions, and to fasten thereto by rivets 34. By this means the length of the package into which my device can be folded, is materially reduced. The two portions 18ª and 18ᵇ into which rod 18 is divided in this construction, I preferably locate on opposite sides of members 10 and 28, thereby providing additional stability for my support, through the double tying of members 28 to members 10, effected by rods 18ª and 18ᵇ, and the relief of the breaking strain on members 28, at the circumference of member 29, effected by the bilateral projection of rods 18ª and 18ᵇ between the upper and lower ends of members 28.

In all forms of construction of my device I prefer to locate members 12 and 29 nearer to the lower than to the upper ends of members 10 and 28, respectively. By doing so, I do not only realize, for any given length of members 10 and 28, a greater distance between rods 14 and 15, and hence greater width for the carrying surface formed by canvas 21, but above all a better and more even distribution of the strain placed on members 10 and 28. This is illustrated in Fig. 10. When a load 32 is placed on canvas 21, it puts a breaking strain upon the upper portions of members 10 and 28 in two directions, indicated by arrows 35 and 36, while it will put a breaking strain on the lower portions of members 10 and 28 in one direction only, indicated by arrow 37. Inasmuch as the breaking strains indicated by arrows 35 and 36 are exerted in opposite directions with reference to each upper portion of members 10 and 28, they largely neutralize each other. Hence the portions of members 10 and 28 extending upward from members 12 and 29 should, if members 10 and 28 are made of equal cross-section throughout their length, be made longer than the portions of members 10 and 28 extending downward from members 12 and 29, in order to prevent waste of material, and to secure equalization of strains.

Where, as shown in Fig. 3, I use, instead of openings 16, near the upper ends of members 10, slots 30, they are preferably made just wide enough to admit the reduced portions of rods 14 and 15.

It is hardly necessary to mention that for convas 21 other material, such as netting, may be substituted, and that canopy cover 27 may be made of any suitable material, varying from a waterproof covering to mere mosquito bar, according to the use to which my device is intended to be put.

It is also evident that my support may be used without the canopy.

A particular advantage of my combination support and canopy, especially in the simple form illustrated by Figs. 1 and 2, is that it can be manufactured, with little labor and expense, from a few standard materials, to-wit:—Eight flat pieces of wood, five pieces of dowel lumber, a piece of canvas with a simple loop sewed along each longitudinal edge thereof; a piece of rectangular covering, without any seams whatsoever; and four hollow metal members. All of these materials can be easily procured, and the labor necessary to fit them for my device is a minimum.

Another special advantage of my combination support and canopy is the ease which the carrying canvas and covering can be completely detached for the purpose of being washed or otherwise cleaned, and the entire absence of hooks, buttons and metal parts from the canvas and cover.

A third special advantage is the ease with which my device can be assembled, and taken down and folded up into a compact package, all other parts being readily rolled up in canvas 21, as shown in Fig. 8.

It is obvious that the construction of my device may be modified in numerous particulars, and that especially my support is adaptable to numerous different uses, without departing from the essentials of my invention. All such modification I intend to cover by my claims.

I claim:

1. In a support, the combination of foldable pairs of sustaining members; hollow metallic members, oscillatably connecting each pair of sustaining members; a main stay-rod detachably entered in the hollow metallic members; carrying rods removably attached, to the upper ends of the sustaining members; and an auxiliary stay-rod detachably entered, near, and parallel to, the main stay-rod, in openings provided in the sustaining members and limiting the motion of the sustaining members; substantially as described.

2. In a support, the combination of three foldable pairs of sustaining members; hollow metallic members, oscillatably connecting each pair of such sustaining members; a two-part main stay-rod detachably entered in the hollow metallic members; two-part carrying rods, removably attached, parallel to the main stay-rod, to the upper ends of the sustaining members; collars detachably joining the two-part rods together; and two auxiliary stay-rods detachably entered, on opposite sides of the main stay-rod, in openings provided in the sustaining members, each of said auxiliary stay-rods extending from the middle pair of sustaining members to one of the end pairs of sustaining members.

3. In a support, the combination of a multiplicity of foldable pairs of sustaining members; hollow metallic members oscillatably connecting each pair of sustaining members; a sectional main stay-rod detachably entered in the hollow metallic members; sectional carrying rods removably attached to the upper ends of the sustaining members; and auxiliary stay-rods entered into openings provided in the sustaining members and alternately located on opposite sides of the main stay-rod, each of said auxiliary stay-rods extending from one pair of sustaining members to an adjoining pair of such members.

4. A foldable combination support and canopy frame comprising foldable pairs, of sustaining members, for the support, and of braces, for the canopy; hollow metallic members, connecting each pair of sustaining members near their middle, and each pair of braces near one end thereof; stay-rods detachably entered in the hollow metallic members; and carrying rods removably attached, parallel to the stay-rods, to the upper ends of the sustaining members.

5. A foldable combination support and canopy frame, comprising foldable pairs, of sustaining members for the support, and of braces for the canopy; hollow metallic members, connecting each pair of sustaining members near their middle, and each pair of braces, near one end thereof; stay-rods detachably entered in the hollow metallic members; carrying rods removably attached, parallel to the stay-rod, to the upper ends of the sustaining members, and engaged by slots in the lower ends of the braces; and a member connecting the carrying rods.

6. A foldable combination support and canopy, comprising foldable pairs of sustaining members for the support, and of braces for the canopy; hollow metallic members, connecting each pair of sustaining members, near their middle, and each pair of braces, near one end thereof; stay-rods detachably entered in the hollow metallic members; carrying rods removably attached, parallel to the connecting rods, to the upper ends of the sustaining members, and supporting the braces; a fabric member suspended between the carrying rods; and a canopy cover adapted to extend over the braces and to have its ends tucked between the sustaining members and the ends of the fabric member.

7. In a support, the combination of foldable pairs of sustaining members; hollow metallic members, oscillatably connecting each pair of sustaining members; a stayrod detachably entered in the hollow metallic members; carrying rods removably attached to the upper ends of the sustaining members; and an auxiliary stayrod provided with grooves, detachably entered with its reduced portions, near and parallel to the main stayrod, into depressions provided in the edges of the sustaining members; and limiting the motion of the sustaining members; substantially as described.

LEWIS W. HARDY.

Witnesses:
CARL STROVER,
JACOB BERG.